United States Patent
Lu et al.

(10) Patent No.: US 12,104,105 B2
(45) Date of Patent: Oct. 1, 2024

(54) SCINTILLATING MATERIAL, PREPARATION METHOD AND USE THEREOF

(71) Applicants: Fujian Institute of Research on The Structure of Matter, Chinese Academy of Sciences, Fuzhou (CN); MINDU INNOVATION LABORATORY, Fuzhou (CN)

(72) Inventors: Jian Lu, Fuzhou (CN); Fakun Zheng, Fuzhou (CN); Juan Gao, Fuzhou (CN); Guocong Guo, Fuzhou (CN)

(73) Assignees: Fujian Institute of Research on The Structure of Matter, Chinese Academy of Sciences, Fuzhou (CN); MINDU INNOVATION LABORATORY, Fuzhou (CN)

( * ) Notice: Subject to any disclaimer, the term of this patent is extended or adjusted under 35 U.S.C. 154(b) by 0 days.

(21) Appl. No.: 18/592,558

(22) Filed: Mar. 1, 2024

(65) Prior Publication Data

US 2024/0254387 A1    Aug. 1, 2024

Related U.S. Application Data (63) Continuation of application No. PCT/CN2022/100779, filed on Jun. 23, 2022.

(30) Foreign Application Priority Data

Sep. 1, 2021  (CN) .......................... 202111021247.8

(51) Int. Cl.
  *C09K 11/06*   (2006.01)
  *C07F 19/00*   (2006.01)
  *G01T 1/202*   (2006.01)

(52) U.S. Cl.
  CPC ............ *C09K 11/06* (2013.01); *C07F 19/005* (2013.01); *G01T 1/2023* (2013.01); *C09K 2211/1007* (2013.01); *C09K 2211/1014* (2013.01)

(58) Field of Classification Search
  CPC ...... C09K 11/06; C07F 19/005; G01T 1/2023
  See application file for complete search history.

(56) References Cited

FOREIGN PATENT DOCUMENTS

| CN | 101058727 A | 10/2007 |
|----|-------------|---------|
| CN | 104447873 A | 3/2015  |

(Continued)

OTHER PUBLICATIONS

Liang-Jin et al. (Highly efficient eco-friendly X-ray scintillators based on an organic manganese halide, Department of Chemistry and Biochemistry, Florida State University, Tallahassee, FL 32306, USA. Nature Communications, (2020) 11:4329, https://doi.org/www.nature.com/nature communications (Year: 2020).*

(Continued)

*Primary Examiner* — Hugh Maupin
(74) *Attorney, Agent, or Firm* — Bayramoglu Law Offices LLC (57) ABSTRACT

A scintillating material, preparation method and use thereof are provided. The chemical formula of the scintillating material is $C_{42}H_{42}X_2MnO_2P_2$, wherein X is selected from a group consisting of Cl and Br. The scintillating material has excellent X-ray scintillation performance and sensitive X-ray detection capability, and the detection limit of the scintillating material is far lower than the conventional medical diagnosis dose criterion of 5.50 $\mu Gy_{air}$/s. Compared with existing commercial scintillating materials, the scintillating material of the present application has remarkable superiority in performance, overcomes the defects of heavy metal pollution, high energy consumption and the like (Continued)

caused in the synthesis process of the scintillating material, and has important commercial application value in the field of green synthesis of high-performance scintillating materials.

17 Claims, 7 Drawing Sheets

(56) References Cited

FOREIGN PATENT DOCUMENTS

| | | |
|---|---|---|
| CN | 110256497 A | 9/2019 |
| CN | 112852407 A | 5/2021 |
| CN | 113801165 A | 12/2021 |

OTHER PUBLICATIONS

E. S. Velmozhynaya, et al., Investigation of the behavior of gadolinium complexes in plastic scintillators, Functional Materials, 2013, pp. 494-499, vol. 20, No. 4.

Bingzi Zhang, et al., A New Alkali-Stable Phosphonium Cation Based on Fundamental Understanding of Degradation Mechanisms, ChemSusChem, 2016, pp. 1-7, vol. 9.

Dumitru Negoiu, Absorbtion Spectra of Some Tetrahedtral Complexes of Mn (II) in the Ligand Field Theory, pp. 25-33.

D. Negoiu, et al., Complex Compounds of Divalent Manganese, Revue Houmaine de Chimie, 1989, pp. 1245-1250, vol. 34, No. 5.

F. Albert Cotton, et al., Correlation of Structure and Triboluminescence for Tetrahedral Manganese(II) Compounds, Inorganic Chemistry, 2001, pp. 3576-3578, vol. 40.

Dorai Periotto, et al., Crystallographic study of some complexes of phosphine oxides with manganese, Ecletica Quimica, 1983, pp. 11-12, vol. 8.

Liang-Jin Xu, et al., Highly efficient eco-friendly X-ray scintillators based on an organic manganese halide, Nature Communications, 2020, pp. 1-7, 11:4329.

* cited by examiner

SCINTILLATING MATERIAL, PREPARATION METHOD AND USE THEREOF

CROSS REFERENCE TO THE RELATED APPLICATIONS

This application is a continuation application of International Application No. PCT/CN2022/100779, filed on Jun. 23, 2022, which is based upon and claims priority to Chinese Patent Application No. 202111021247.8, filed on Sep. 1, 2021, the entire contents of which are incorporated herein by reference.

TECHNICAL FIELD

The present application relates to a scintillating material, a preparation method and a use thereof, which belongs to the field of scintillating materials.

BACKGROUND

Scintillating materials are materials that can emit flashes of light by converting the kinetic energy of high-energy particles into light energy under the impact of high-energy particles. Currently commercial scintillating materials mainly include bismuth germanate $Bi_4Ge_3O_{12}$ (BGO), lead tungstate $PbWO_4$ (PWO), cadmium tungstate $CdWO_4$ (CWO), and lutetium-yttrium oxyorthosilicate $Lu_{1.8}Y_{0.2}SiO_5$:Ce (LYSO) and so on. These scintillating materials are often fired at high temperatures above 1000° C., with extremely high industrial energy consumption, and are prone to heavy metal pollution in the production environment due to the presence of heavy metals and other elements, as well as the presence of tiny scattering particles and the deposition of activator ions in high-temperature single-crystal growth are also prone to bring about significant differences in performance.

At the same time, with the development of technology and environmental protection requirements, green scintillating materials with more excellent performance are needed, therefore, under the premise of improving the scintillation performance, it is also necessary to have characteristics of heavy metal free, environmentally friendly, easy to process, which has become an important research direction for new scintillating materials.

SUMMARY

According to an aspect of the present application, a scintillating material is provided. The scintillation intensity of the compound $C_{42}H_{42}Cl_2MnO_2P_2$ is about 0.87 times that of a bismuth germanate BGO scintillating crystal, and the scintillation intensity of the compound $C_{42}H_{42}Br_2MnO_2P_2$ is about 4.27 times that of BGO.

According to an aspect of the present application, a scintillating material is provided. The chemical formula of the scintillating material is shown in Formula I:

$$C_{42}H_{42}X_2MnO_2P_2 \quad \text{Formula I}$$

where X is selected from a group consisting of Cl and Br.

The scintillating material may be a bulk single crystal or a crystalline powder.

The scintillating material does not contain heavy metals.

Optionally, the scintillating material contains two asymmetric structural units.

The asymmetric structural units comprise one oxidized tris(o-methylphenyl)oxaphosphorus ligand, one semi-occupied $Mn^{2+}$ ion and one X ion; $C_{21}H_{21}P$ is an aromatic ring organophosphine compound.

The microscopic morphology of the scintillating material is a zero-dimensional structure.

Optionally, in the scintillating material, the $Mn^{2+}$ is a +2 valence metal ion with a tetrahedral spatial coordination structure.

Figure 8:
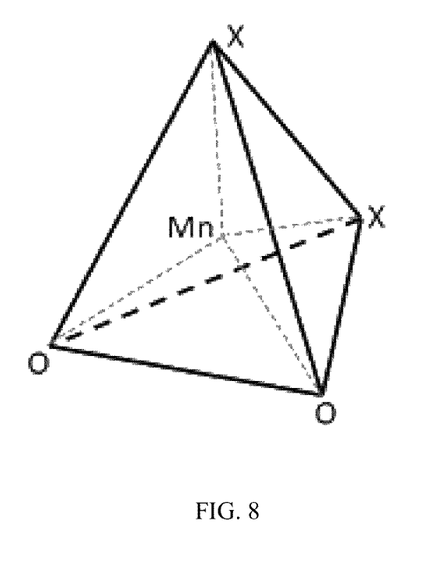
FIG. 8 is the tetrahedral spatial coordination structure of the Mn2.

Its tetrahedral spatial coordination structure is shown in FIG. 8.

In the coordination, both of X are Cl; or both of X are Br;

When X=Cl, the Mn—Cl bond length is 2.3303(6) Å and the Mn—O bond length is 2.0494(14) Å. Centered on Mn, the Cl1A-Mn1-Cl1 bond angle is 111.61(4)', the O1A-Mn1-Cl1A bond angle is 113.29(5)', the O1-Mn1-Cl1A bond angle is 107.64.61(5)', the O1-Mn1-Cl1 bond angle is 113.29(5)', and the O1A-Mn1-Cl1A bond angle is 107.17(9)', all of which are within the normal range of values, where A is the symmetry operation code 3/2-x, +y, 1-z.

When X=Br, the Mn—Br bond length is 2.4708(5) Å and the Mn—O bond length is 2.0348(19) Å. Centered on Mn, the Br1A-Mn1-Br1 bond angle is 112.82(3)', the O1A-Mn1-Br1 bond angle is 106.07(6)', the O1A-Mn1-Br1A bond angle is 113.71(6)', the O1-Mn1-Br1 bond angle is 113.71(6)', and O1A-Mn1-O1 bond angle is 104.31(12)', all of which are within the normal range of values, where A is the symmetry operation code 1-x, +y, 1/2-z.

Optionally, the crystal structure of the scintillating material belongs to a monoclinic crystal system with a C2/c space group structure.

Optionally, among the lattice parameters of the scintillating material, a(c)=20.5 Å-22.5 Å, b=9.5 Å-11.5 Å, c(a)=17.5 Å-19.5 Å, β=100°-120°.

Optionally, in Formula I, X is Cl; and among lattice parameters of the scintillating material, a=21.490 Å-21.496 Å, b=10.512 Å-10.518 Å, c=18.655 Å-18.671 Å, β=110.67°-114.67°.

Optionally, in Formula I, X is Br; and among lattice parameters of the scintillating material, a=18.586 Å-18.592 Å, b=10.614 Å-10.620 Å, c=21.916 Å-21.922 Å, =111.15°-115.15°.

Optionally, among lattice parameters of the scintillating material, α=90°, γ=90°, Z=4.

Optionally, under ultraviolet excitation with wavelength in a range from 135 nm to 420 nm, an emission peak of the scintillating material is in a range from 510 nm to 514 nm, which is green light emission.

Optionally, the scintillating material has good thermal stability, and the thermal decomposition temperature of the scintillating material is in a range from 275° C. to 285° C.

Optionally, in Formula I, X is Cl, and the scintillating material is .

Optionally, in Formula I, X is Cl, scintillation intensity of the scintillating material is 0.5 to 1 time that of a bismuth germanate scintillating crystal.

Optionally, in Formula I, X is Br, the scintillating material is $C_{42}H_{42}Br_2MnO_2P_2$; and scintillation intensity of the scintillating material is 4 to 5 times that of bismuth germanate scintillating crystal, and scintillation intensity of the scintillating material is 0.8 to 1.2 times that of a lutetium-yttrium oxyorthosilicate scintillating crystal.

According to another aspect of the present application, there is provided a method of the scintillating material. The method has simple steps, high purity and high yield of product, and is suitable for large-scale industrial production.

Optionally, the method comprises the following steps:
(1) mixing tris(o-methylphenyl)phosphorus with a solvent and a peroxide, and obtaining a mixture after an oxidation reaction;
(2) adding a $MnX_2$ metal salt to the mixture obtained in step (1) and obtaining the scintillating material after a coordination reaction.

The scintillating material can be cooled and filtered after the coordination reaction, and the filtrate is placed in an ether atmosphere for about a week to precipitate crystals; or crystals can be obtained directly by cooling after the coordination reaction.

The tris(o-methylphenyl)phosphorus ($C_{21}H_{21}P$) is an aromatic ring organophosphine compound.

Optionally, the solvent is at least one selected from the group consisting of protonic solvents such as ethanol, methanol, tetrahydrofuran, N-methylpyrrolidone and the like.

Optionally, the peroxide is at least one selected from the group consisting of hydrogen peroxide, benzoyl peroxide, potassium peroxymonosulfate, potassium persulfate, ammonium peroxymonosulfate, and ammonium persulfate.

Optionally, a molar ratio of the tris(o-methylphenyl)phosphorus to the peroxide is (1-5):(2-10), and a molar ratio of the tris(o-methylphenyl)phosphorus to the $MnX_2$ metal salt is: (1-5):(1-5).

Preferably, the molar ratio of the tris(o-methylphenyl)phosphorus to the peroxide is (1-2):(2-4), and the molar ratio of the tris(o-methylphenyl)phosphorus to the $MnX_2$ metal salt is: (1-2):(1-2).

The volume of the solvent is not less than 10 mL.

Optionally, in step (1), a reaction temperature of the oxidation reaction is in a range from 70° C. to 100° C.; and a reaction time is in a range from 12 h to 24 h;
in step (2), a reaction temperature of the coordination reaction is in a range from 80° C. to 100° C.; and a reaction time is in a range from 12 h to 24 h.

Those skilled in the art may select a suitable reaction time and reaction temperature according to the actual need, subject to the reaction being fully carried out.

Preferably, the lower limit of the reaction temperature of the oxidation reaction is independently selected from 70° C., 75° C., 80° C., and the upper limit of the reaction temperature of the oxidation reaction is independently selected from 90° C., 95° C., 100° C.

Preferably, the lower limit of the reaction time of the oxidation reaction is independently selected from 12 hours, 14 hours, 18 hours, and the upper limit of the reaction time of the oxidation reaction is independently selected from 20 hours, 22 hours, 24 hours.

Preferably, the lower limit of the reaction temperature of the coordination reaction is independently selected from 80° C., 85° C., 90° C., and the upper limit of the reaction temperature of the coordination reaction is independently selected from 95° C., 100° C.

Preferably, the lower limit of the reaction time of the coordination reaction is independently selected from 12 hours, 14 hours, 16 hours, and the upper limit of the reaction time of the coordination reaction is independently selected from 18 hours, 22 hours, 24 hours.

According to a further aspect of the present application, there is provided a use of a scintillating material in energetic particles detection and/or imaging visualization, where the scintillating material comprises the scintillating material and/or the scintillating material obtained by the method described above;
the energetic particles comprise X-rays.

Optionally, the scintillating material has a sensitive X-ray detection capability, and a detection limit of the scintillating material is 3.90 $\mu Gy_{air}/s$ when the scintillating material is $C_{42}H_{42}Cl_2MnO_2P_2$.

Preferably, a detection limit of the scintillating material is 0.82 $\mu Gy_{air}/s$ when the scintillating material is $C_{42}H_{42}Br_2MnO_2P_2$.

All are below the conventional medical diagnostic dose criterion of 5.50 $\mu Gy_{air}/s$.

According to a further aspect of the present application, a use of the X-ray detection and imaging display materials in X-ray dose monitoring is provided.

Beneficial effects that can be produced by the present application include:
(1) The present application provides a scintillating material. The scintillating material has good thermal stability and excellent X-ray scintillation performance, and the synthesis process is green and environmentally friendly. The upper limit of thermal stability of such scintillating material is experimentally determined to be as high as 280° C., and the scintillation intensity of compound $C_{42}H_{42}Cl_2MnO_2P_2$ is about 0.87 times that of bismuth germanate BGO scintillating crystals, and the scintillation intensity of compound $C_{42}H_{42}Br_2MnO_2P_2$ is about 4.27 times that of BGO, and it overcomes the drawbacks of heavy metal pollution and high industrial energy consumption that exists in conventional commercial scintillators, and it has important commercial application value in the field of scintillating materials. It has important commercial application value in the field of scintillating materials.
(2) The present application provides an X-ray detection and imaging display material. Compound $C_{42}H_{42}Cl_2MnO_2P_2$ and compound $C_{42}H_{42}Br_2MnO_2P_2$ have sensitive X-ray detection capabilities, with detection limits of 3.90 $\mu Gy_{air}/s$ and 0.82 $\mu Gy_{air}/s$, respectively, which are below the conventional medical diagnostic dose criterion of 5.50 $\mu Gy_{air}/s$. High-performance X-ray detection capabilities can further improve the spatial resolution of imaging display devices, which is essential for high-quality imaging. The high-performance X-ray detection capability can further improve the spatial resolution of the display device, which is crucial for high-quality imaging, and has important commercial application value in the field of high-energy particle detection and imaging display materials.
(3) The present application provides a method of preparing the above-mentioned scintillating materials. The method is simple, and the scintillating material obtained has high purity, good crystallinity and high yield, and is suitable for large-scale industrialized production.

BRIEF DESCRIPTION OF THE DRAWINGS

FIG. 1A is the schematic diagram of the crystal structure of Sample 1-Cl[#]; and FIG. 1B is the schematic diagram of the crystal structure of Sample 2-Br[#].

FIG. 2A is the theoretical XRD diffraction pattern obtained by fitting the single crystal data of Sample 1-Cl$^\#$ and its experimentally measured XRD diffraction pattern; and FIG. 2B is the theoretical XRD diffraction pattern obtained by fitting the single crystal data of Sample 2-Br$^\#$ and its experimentally measured XRD diffraction pattern.

FIG. 3A is the thermal stability experimental profile of Sample 1-Cl$^\#$; FIG. 3B is the thermal stability experimental profile of Sample 2-Br$^\#$.

FIGS. 4A-4B are a photoluminescence experimental profile of Sample 1-Cl$^\#$ obtained in Example 1 and Sample 2-Br$^\#$ obtained in Example 2, including the optimal excitation wavelength and the optimal emission wavelength, where FIG. 4A is the photoluminescence experimental profile of Sample 1-Cl$^\#$; FIG. 4B is the photoluminescence experimental profile of Sample 2-Br$^\#$.

FIG. 5A is the X-ray scintillation luminescence experimental profile of Sample 1-Cl$^\#$; FIG. 5B is the X-ray scintillation luminescence experimental profile of Sample 2-Br$^\#$.

DETAILED DESCRIPTION OF THE EMBODIMENTS

The present application will be described in detail below with reference to Examples, but the present disclosure is not limited to these Examples.

Unless otherwise specified, the raw materials in the Examples of the present application were purchased commercially, in which tris(o-methylphenyl)phosphorus, manganese chloride, manganese bromide dihydrate were purchased from Meryer (Shanghai) Chemical Technology Co., Ltd.; protonaceous solvents such as ethanol and methanol, as well as peroxides including hydrogen peroxide, etc., were purchased from SINOPHARM.

Example 1 Preparation of Sample 1-Cl$^\#$

A mixed solution of 3 mmol of tris(o-methylphenyl)phosphorus in ethanol and hydrogen peroxide (18 mL, V:V=16:2) was placed at a reaction temperature of 100° C. for 12 hours and then cooled down to room temperature, and 3 mmol of a metal salt $MnCl_2$ was added to continue the reaction at a reaction temperature of 100° C. for another 12 hours; after cooling, it was filtered, and crystals precipitated by placing the filtrate in an ether atmosphere for about a week, with a yield of 87% (based on $MnCl_2$), and the chemical formula of the crystals was $C_{42}H_{42}Cl_2MnO_2P_2$.

Example 2 Preparation of Sample 2-Br$^\#$

A mixed solution of 3 mmol of tris(o-methylphenyl)phosphorus in ethanol and hydrogen peroxide (18 mL, V:V=16:2) was placed at a reaction temperature of 100° C. for 12 hours and then cooled down to room temperature, and 3 mmol of a metal salt $MnBr_2 \cdot 2H_2O$ was added to continue the reaction at a reaction temperature of 100° C. for another 12 hours; after cooling, bulk single crystals suitable for X-ray single-crystal diffraction experiments can be obtained directly; filtered, placed the filtrate in an ether atmosphere for about a week, and the crystals continued to precipitate with a yield of 91% (based on $MnBr_2 \cdot 2H_2O$), and the chemical formula of the crystals was $C_{42}H_{42}Br_2MnO_2P_2$.

Test Example 1 Structural Characterization of Samples

Figure 1A:
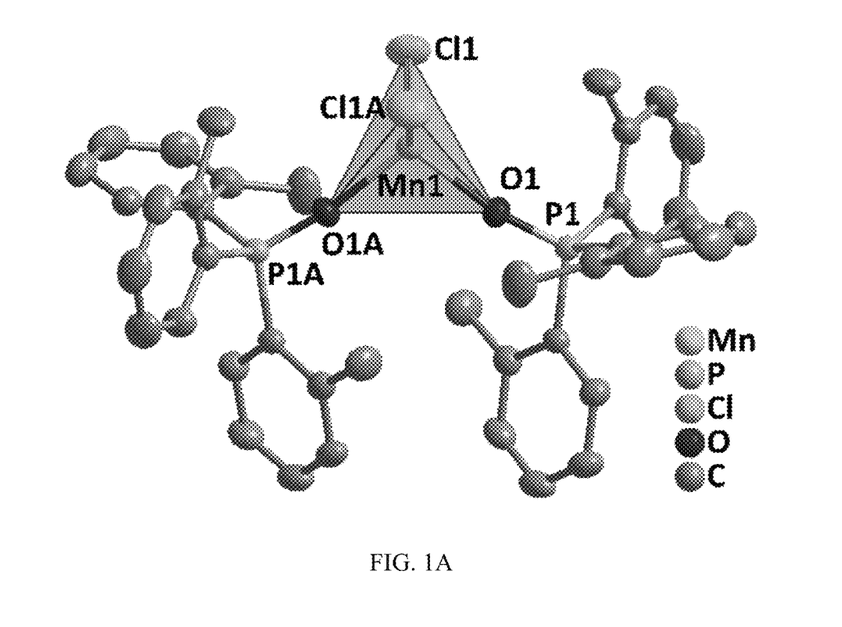
FIGS. 1A-1B are a schematic diagram of the crystal structure (without hydrogen atoms) of Sample 1-Cl[#] obtained in Example 1 and Sample 2-Br[#] obtained in Example 2, where

Single crystal X-ray diffraction of Samples 1-Cl$^\#$ and 2-Br$^\#$ was carried out on a Mercury CCD-type single crystal diffractometer with a Mo target, a Kα radiation source (λ=0.7107 Å), and a test temperature of 293K. Structural resolution was carried out by Olex$^2$ 1.2. The test results are shown in FIG. 1A, one oxidized tris(o-methylphenyl)oxaphosphorus ligand, one semi-occupied $Mn^{2+}$ ion and one $Cl^-$ ion were contained in the asymmetric unit; by symmetrization operation, it can be seen that Mn is a tetra-coordinated aberrant tetrahedral geometrical configuration, in which the Mn—Cl bond length is 2.3303(6) Å, and the Mn—O bond length is 2.0494(14) Å; centered on Mn, the Cl1A-Mn1-Cl1 bond angle is 111.61(4°), the O1A-Mn1-Cl1A bond angle is 113.29(5)', the O1-Mn1-Cl1A bond angle is 107.64.61(5°), the O1-Mn1-Cl1 bond angle is 113.29(5)', the O1A-Mn1-ClA bond angle is 107.17(9)', all of which are within normal range of values, where A is the symmetrization operation code 3/2-x, +y, 1-z.

Figure 1B:
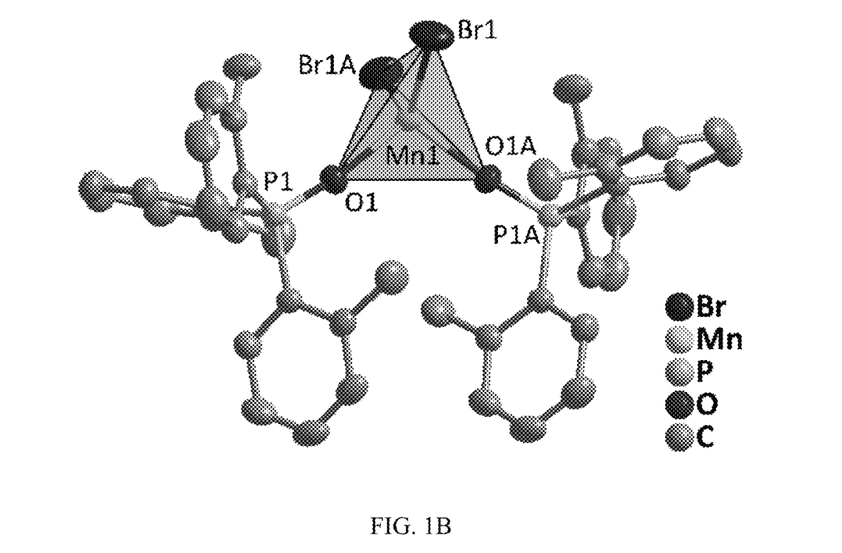

Single crystal X-ray diffraction (XRD) physical phase analysis of Samples 1-Cl$^\#$ and 2-Br$^\#$ after grinding was performed on a MiniFlex 600 X-ray diffractometer from Rigaku, with a Cu target, a Kα radiation source (2=1.54184 Å). The test results are shown in FIG. 1B, one oxidized tris(o-methylphenyl)oxaphosphorus ligand, one semi-occupied $Mn^{2+}$ ion and one $Br^-$ ion were contained in the asymmetric unit; by symmetrization operation, it can be seen that Mn is in a tetra-coordinated aberrated tetrahedral geometrical configuration, with a Mn—Br bond length of 2.4708(5) Å and a Mn—O bond length of 2.0348(19) Å; centered on Mn, the Br1A-Mn1-Br1 bond angle is 112.82 (3)', the O1A-Mn1-Br1 bond angle is 106.07(6)', the O1A-Mn1-Br1A bond angle is 113.71(6)', the O1-Mn1-Br1 bond angle is 113.71(6)', and the O1A-Mn1-O1 bond angle is 104.31 (12)', all of which are within normal range of values, where A is the symmetrization operation code 1-x, +y, 1/2-z.

Figure 2A:
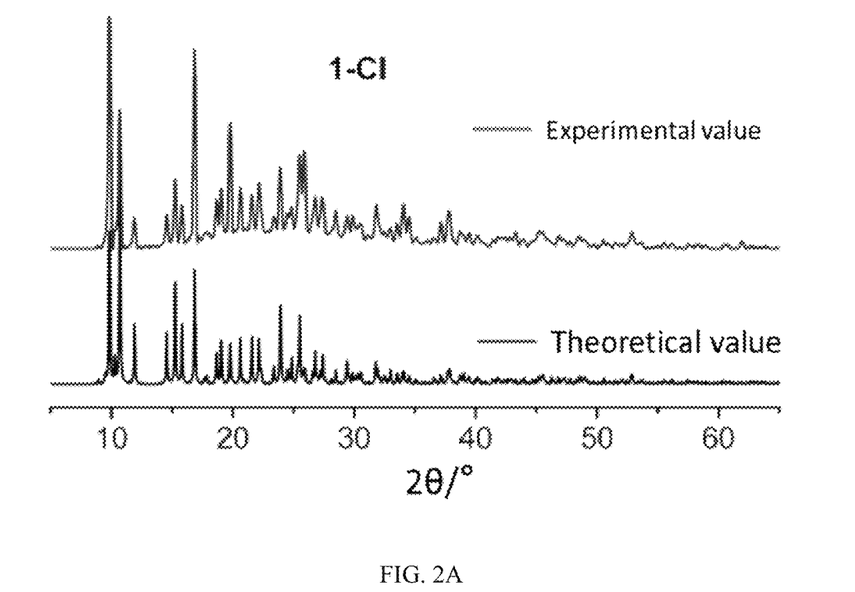
FIGS. 2A-2B are a theoretical XRD diffraction pattern obtained by fitting the single crystal data of Sample 1-Cl[#] obtained in Example 1 and Sample 2-Br[#] obtained in Example 2 and its experimentally measured XRD diffraction pattern, where
Figure 2B:
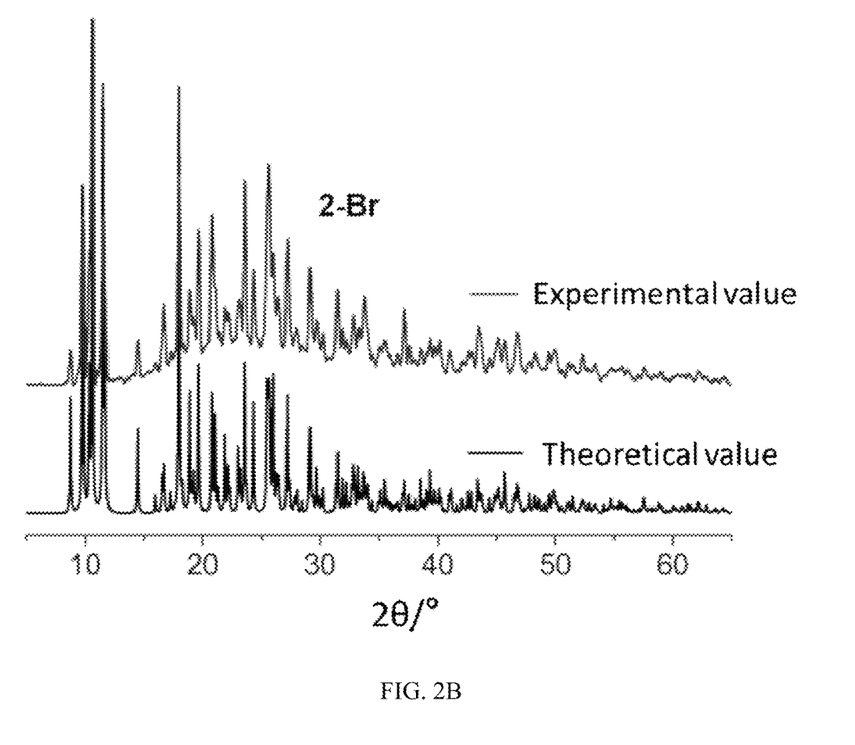

Comparison of the theoretical XRD diffraction pattern obtained by fitting X-ray single crystal diffraction with its XRD diffraction pattern measured by X-ray powder diffraction phase analysis is shown in FIGS. 2A-2B, which shows that the XRD diffraction pattern obtained by fitting single-crystal data is in high agreement with its experimentally measured XRD diffraction pattern, which proves that the resulting sample is a high purity and high crystallinity sample.

The X-ray powder diffraction and X-ray single crystal diffraction results show that:

Samples 1-Cl$^\#$ (chemical formula $C_{42}H_{42}Cl_2MnO_2P_2$) and 2-Br$^\#$ (chemical formula $C_{42}H_{42}Br_2MnO_2P_2$) both belong to a C2/c space group of a monoclinic crystal system.

For Sample 1-Cl$^\#$, the cell parameters are a=21.4929(9) Å, b=10.5149(3) Å, c=18.6578(9) Å, α=90°, β=112.674(5°), γ=90°, and Z=4;

For Sample 2-Br$^\#$, the cell parameters are a=18.5888(8) Å, b=10.6170(3) Å, c=21.9189(8) Å, α=90°, β=113.149(5°), γ=90°, Z=4.

Test Example 2 Thermal Stability Test Experiment

Figure 3A:
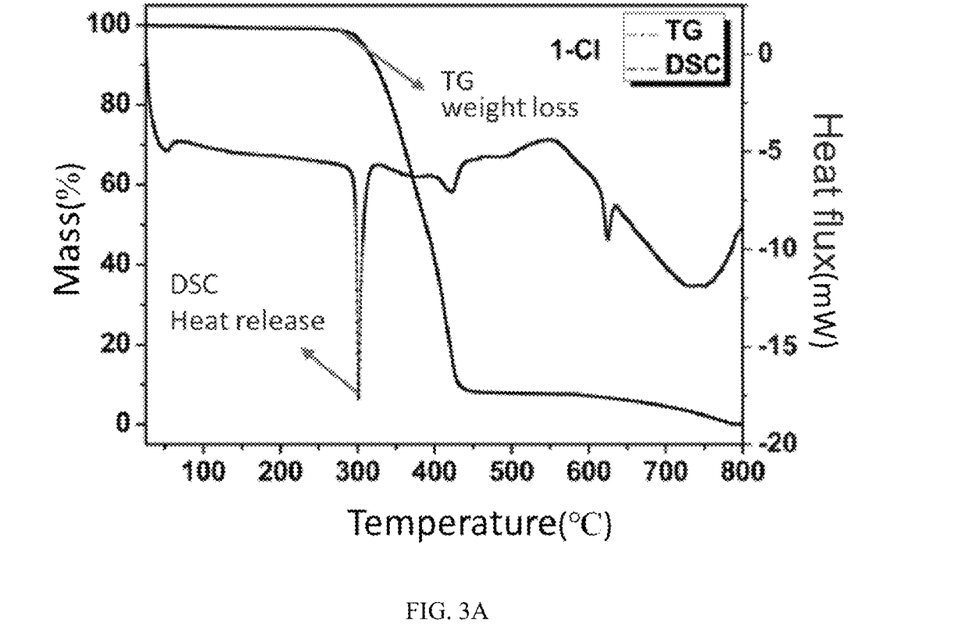
FIGS. 3A-3B are a thermal stability experimental profile of Sample 1-Cl$^\#$ obtained in Example 1 and Sample 2-Br$^\#$ obtained in Example 2, where
Figure 3B:
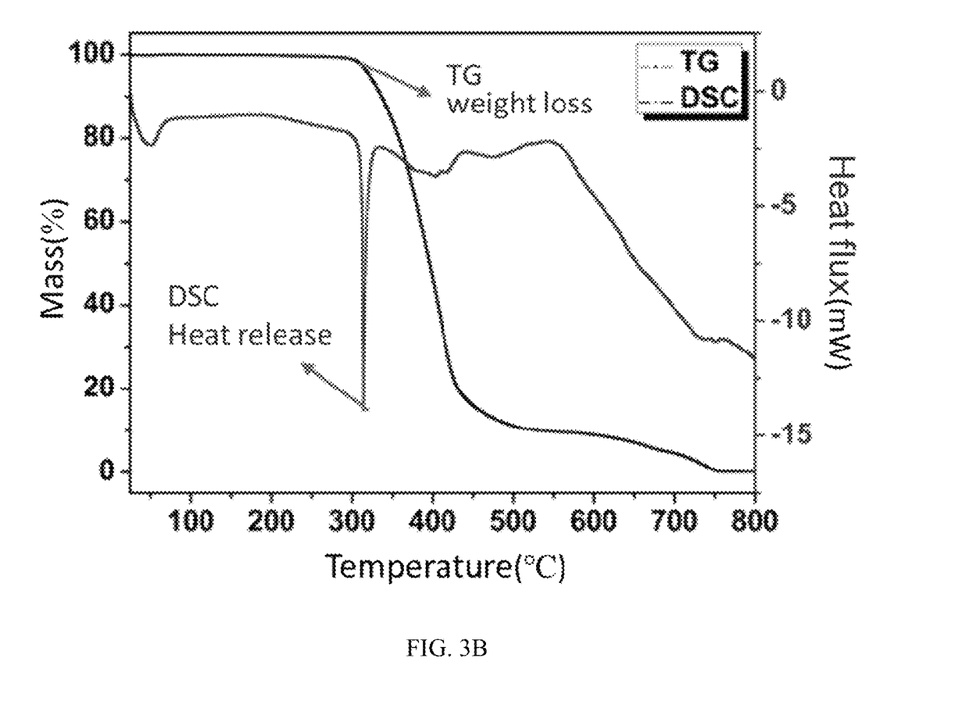

The thermal stability of Samples 1-Cl$^\#$ and 2-Br$^\#$ can be measured in a TGA&DSC METTLER TOLEDO thermogravimetric analyzer under nitrogen atmosphere. As shown in FIGS. 3A-3B, Samples 1-Cl# and 2-Br# have good thermal stability, and still maintain the structural integrity at 280° C.

Test Example 3 X-Ray Scintillation Performance Test Experiment

X-ray scintillation performance test experiments on Samples 1-Cl# and 2-Br# were carried out in the following steps:

A X-ray scintillation performance comprehensive test platform was built by ourselves; before testing the samples, BGO and LYSO purchased from Xiamen Centro Spark Optoelectronics Technology Co., Ltd. were used as reference samples, and the samples had to be screened for photoluminescence performance test under UV excitation before X-ray scintillation performance test, with Edinburgh FLS920 for photoluminescence performance test as selected instrument, in which the excitation source was an Xe lamp, and a specific excitation band of UV could be selected by the filtering system with an excitation slit of 1 mm and a receiving slit of 1 mm.

Figure 4A:
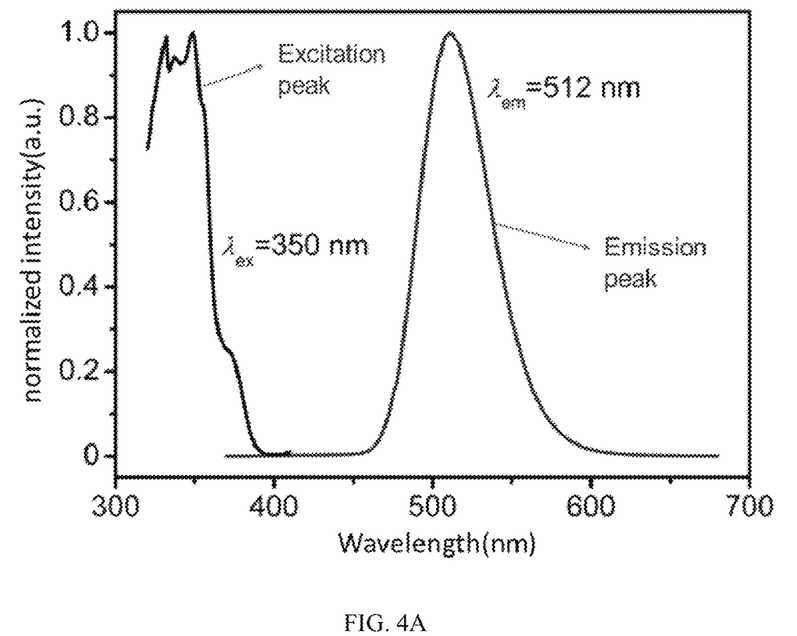
Figure 4B:
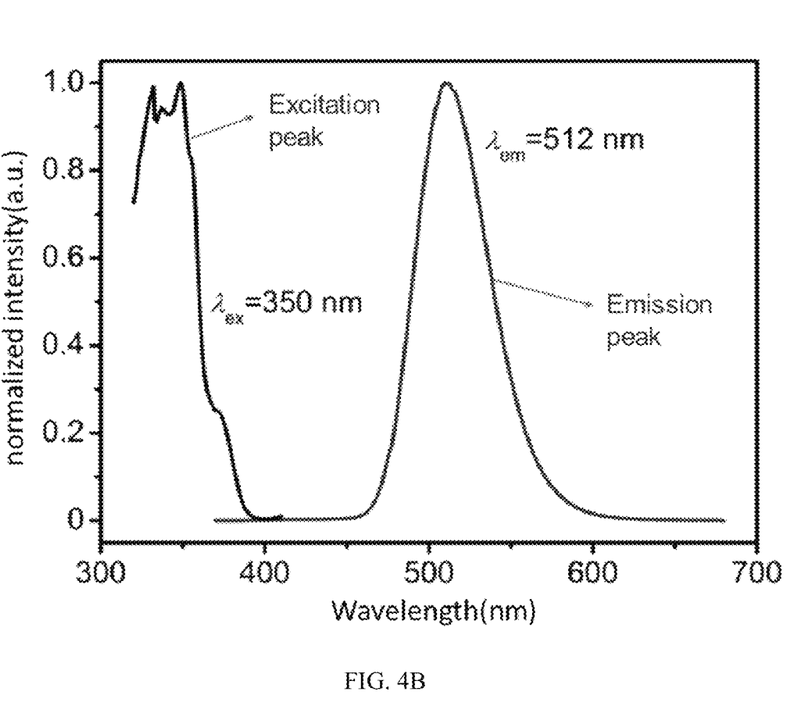

The experimental spectra of photoluminescence are shown in FIGS. 4A-4B. The optimum photoluminescence peaks of Samples 1-Cl# and 2-Br# were at 512±2 nm with green emission under the optimum wavelength excitation at 350 nm.

Figure 5A:
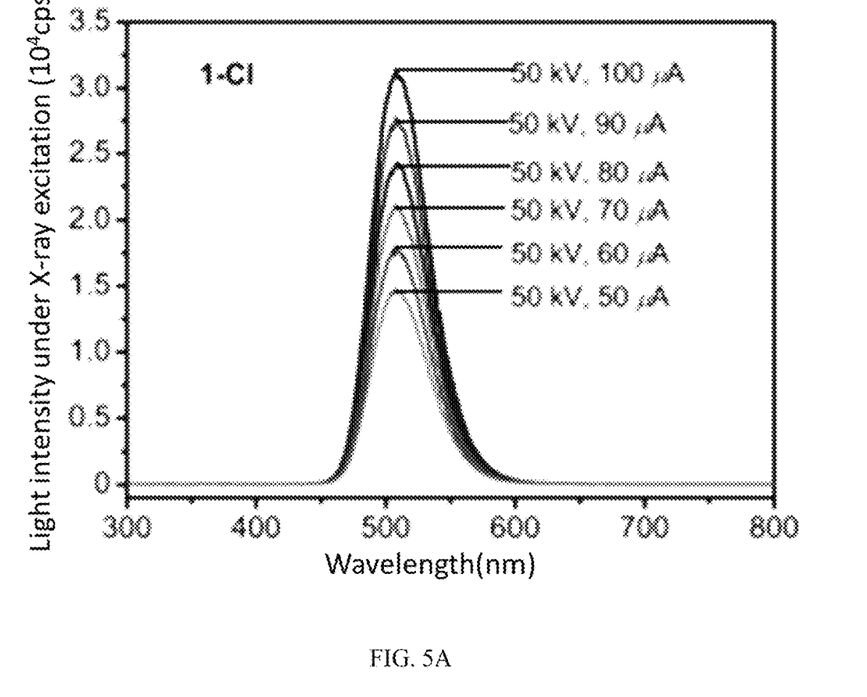
FIGS. 5A-5B are an X-ray scintillation luminescence experimental profile of Sample 1-Cl$^\#$ obtained in Example 1 and Sample 2-Br$^\#$ obtained in Example 2, where
Figure 5B:
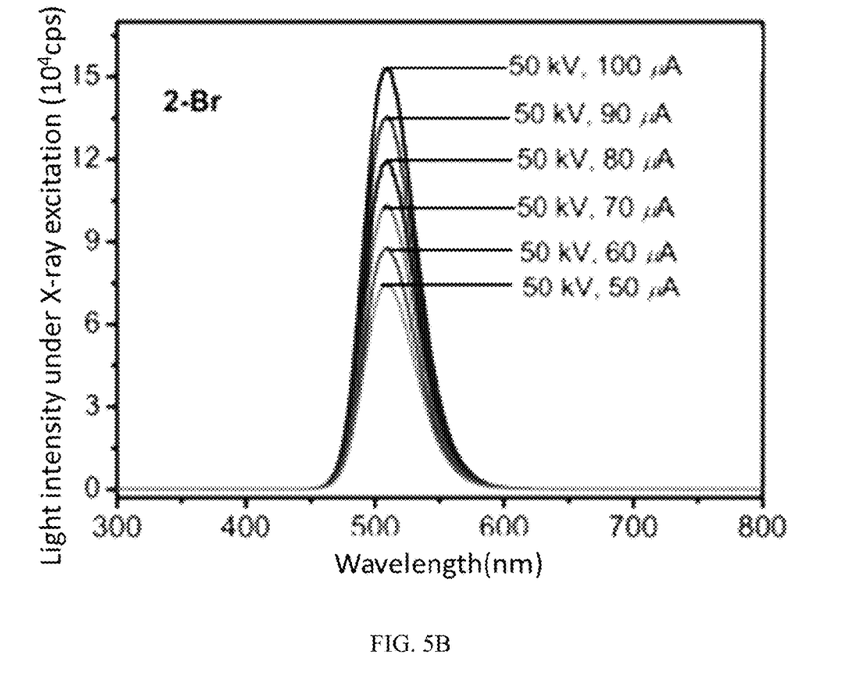

The experimental spectra of X-ray scintillation properties are shown in FIGS. 5A-5B. The scintillation emission of Samples 1-Cl# and 2-Br# was also at 512±2 nm. And when the tube voltage of the X-ray tube was fixed and the tube current of the X-ray tube was changed, both Samples 1-Cl# and 2-Br# exhibited scintillation signals at 512±2 nm; the scintillation intensities of Samples 1-Cl# and 2-Br# changed linearly with the change of the X-ray dose. When the tube voltage was fixed at 50 kV and the tube current was gradually reduced from 100 µA to 50 µA, the X-ray scintillation performance decreased sequentially.

Figure 6:
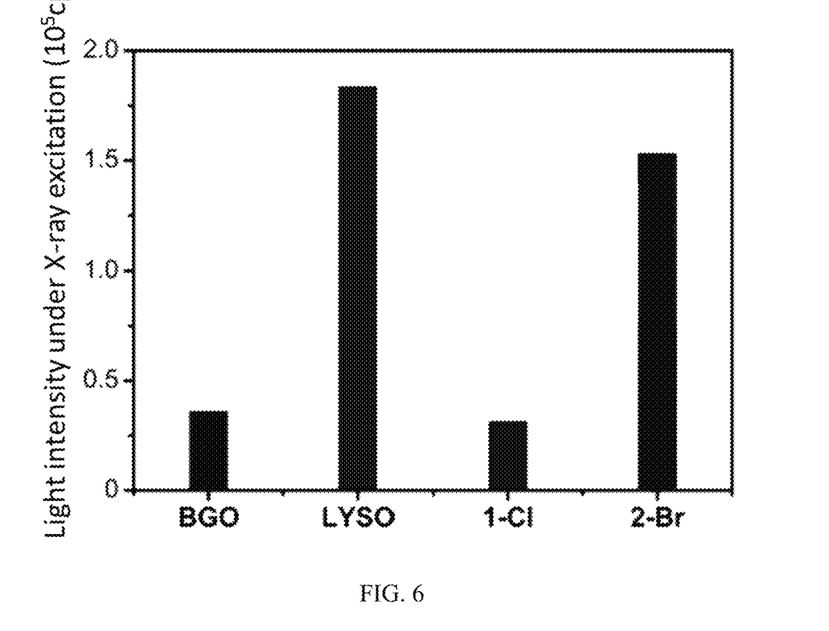
FIG. 6 is an experimental comparative plot of the scintillation performance of Sample 1-Cl$^\#$ obtained in Example 1 and Sample 2-Br$^\#$ obtained in Example 2.

The comparative experimental spectra of the scintillation performance are shown in FIG. 6, in which the tube voltage of the X-ray tube is 50 kV, the tube current of the X-ray tube is 100 µA, the distance between the sample and the X-ray tube is 5 cm, and the weight of the test sample is 100 mg. It can be seen that, under the same test conditions, the scintillation intensity of Sample 1-Cl# was determined to be about 0.87 times that of bismuth germanate BGO scintillating crystals, and the scintillation intensity of Sample 2-Br# was about 4.27 times that of BGO and 0.92 times that of lutetium-yttrium oxyorthosilicate LYSO. Compared with the current commercial scintillating materials, 1-Cl#~BGO<2-Br#~LYSO, the scintillating materials described in the present application are comparable in performance to the commercial scintillating materials, yet are much more inexpensive to synthesize, with greatly advantageous conditions.

Figure 7:
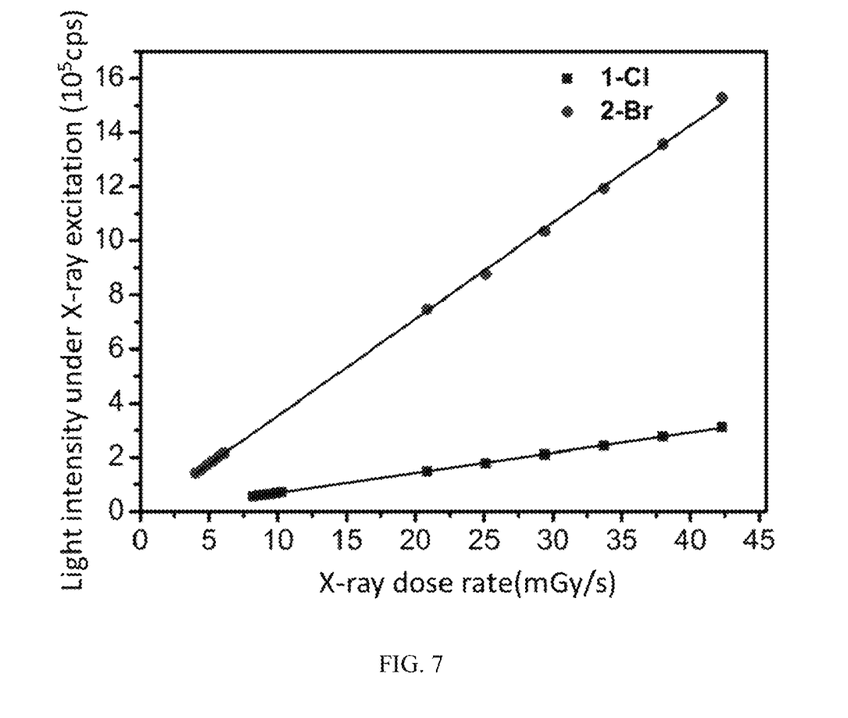
FIG. 7 is an experimental plot of Sample 1-Cl$^\#$ obtained in Example 1 and Sample 2-Br$^\#$ obtained in Example 2 against X-ray dose detection.

The experimental detection of X-ray dose is shown in FIG. 7, in which the X-ray dose can be realized by fixing the tube voltage and changing the tube current of the X-ray tube, and the dose detected by the reagent is corrected by a RAMION radiation dosimeter. The linear slope of the curve indicates the detection sensitivity of the scintillating material to high-energy X-rays, |k(2-Br)|>|k(1-Cl), which indicates that the detection sensitivity of the scintillating material Sample 2-Br# to high-energy X-rays is better than that of the scintillating material Sample 1-Cl#. According to the International Union of Pure and Applied Chemistry, the dose detection limit of X-rays is 3σ, σ is the ratio of the standard deviation of the instrumental noise to the slope of the X-ray dose detection curve |k|, and the standard deviation of the instrumental noise is 0.97, so the detection limits of Samples 1-Cl# and 2-Br# can be derived to be 3.90 µGy$_{air}$/s and 0.82 µGy$_{air}$/S, respectively, which are below the conventional medical diagnostic dose criterion of 5.50 µGy$_{air}$/s. This indicates that Sample 1-Cl# and Sample 2-Br# have sensitive X-ray detection capability.

The above Examples are merely some of the Examples of the present application, and do not limit the present application in any form. Although the present application is disclosed above with the preferred Examples, the present application is not limited thereto. Some changes or modifications made by any technical personnel familiar with the profession using the technical content disclosed above without departing from the scope of the technical solutions of the present application are equivalent to equivalent implementation cases and fall within the scope of the technical solutions.

What is claimed is:

1. A scintillating material, wherein a chemical formula of the scintillating material is shown in a Formula I:

$$C_{42}H_{42}X_2MnO_2P_2 \qquad \text{Formula I}$$

wherein the X is selected from the group consisting of Cl and Br;
wherein the scintillating material comprises two asymmetric structural units;
wherein each of the two asymmetric structural units comprises a oxidized tris(o-methylphenyl)oxaphosphorus ligand, a semi-occupied $Mn^{2+}$ ion, and an X ion;
wherein a microscopic morphology of the scintillating material is a zero-dimensional structure.

2. The scintillating material according to claim 1, wherein in the scintillating material, the semi-occupied $Mn^{2+}$ ion is in a tetrahedral spatial coordination structure.

3. The scintillating material according to claim 1, wherein a crystal structure of the scintillating material belongs to a monoclinic crystal system with a C2/c space group structure.

4. The scintillating material according to claim 1, wherein in the Formula I, the X is Cl; and among lattice parameters of the scintillating material, a=21.490 Å-21.496 Å, b=10.512 Å-10.518 Å, c=18.655 Å-18.671 Å, β=110.67°-114.67°.

5. The scintillating material according to claim 1, wherein in the Formula I, the X is Br; and among lattice parameters of the scintillating material, a=18.586 Å-18.592 Å, b=10.614 Å-10.620 Å, c=21.916 Å-21.922 Å, β=111.15°-115.15°.

6. The scintillating material according to claim 1, wherein among lattice parameters of the scintillating material, α=90°, γ=90°, Z=4.

7. The scintillating material according to claim 1, wherein under an ultraviolet excitation with a wavelength in a range from 135 nm to 420 nm, an emission peak of the scintillating material is in a range from 510 nm to 514 nm, and an emission of the scintillating material is a green light emission.

8. The scintillating material according to claim 1, wherein a thermal decomposition temperature of the scintillating material is in a range from 275° C. to 285° C.

9. The scintillating material according to claim 1, wherein in the Formula I, the X is Cl; and a scintillation intensity of the scintillating material is 0.5 to 1 time a scintillation intensity of a bismuth germanate scintillating crystal.

10. The scintillating material according to claim 1, wherein
in the Formula I, the X is Br; and a scintillation intensity of the scintillating material is 4 to 5 times a scintillation intensity of a bismuth germanate scintillating crystal; and the scintillation intensity of the scintillating material is 0.8 to 1.2 times a scintillation intensity of a lutetium-yttrium oxyorthosilicate scintillating crystal.

11. A method of preparing the scintillating material according to claim 1, comprising
(1) mixing tris(o-methylphenyl)phosphorus with a solvent and a peroxide to obtain a mixture after an oxidation reaction;
(2) adding a $MnX_2$ metal salt to the mixture obtained in step (1) to obtain the scintillating material after a coordination reaction.

12. The method according to claim 11, wherein the solvent is at least one selected from the group consisting of ethanol, methanol, tetrahydrofuran, and N-methylpyrrolidone; and
the peroxide is at least one selected from the group consisting of hydrogen peroxide, benzoyl peroxide, potassium peroxymonosulfate, potassium persulfate, ammonium peroxymonosulfate, and ammonium persulfate.

13. The method according to claim 11, wherein
a molar ratio of the tris(o-methylphenyl)phosphorus to the peroxide to the $MnX_2$ metal salt is (1-5):(2-10):(1-5).

14. The method according to claim 11, wherein
in step (1), a reaction temperature of the oxidation reaction is in a range from 70° C. to 100° C.; and a reaction time of the oxidation reaction is in a range from 12 h to 24 h;
in step (2), a reaction temperature of the coordination reaction is in a range from 80° C. to 100° C.; and a reaction time of the coordination reaction is in a range from 12 h to 24 h.

15. A use of the scintillating material according to claim 1 in an energetic particles detection and/or an imaging visualization;
wherein energetic particles comprise X-rays.

16. The use according to claim 15, wherein
a detection limit of the scintillating material is 3.90 $\mu Gy_{air}/s$ when the scintillating material is $C_{42}H_{42}C_{12}MnO_2P_2$.

17. The use according to claim 15, wherein
a detection limit of the scintillating material is 0.82 $\mu Gy_{air}/s$ when the scintillating material is $C_{42}H_{42}Br_2MnO_2P_2$.

* * * * *